United States Patent [19]

Needham et al.

[11] Patent Number: 5,765,175

[45] Date of Patent: Jun. 9, 1998

[54] SYSTEM AND METHOD FOR REMOVING DELETED ENTRIES IN FILE SYSTEMS BASED ON WRITE-ONCE OR ERASE-SLOWLY MEDIA

[75] Inventors: Bradford H. Needham, Hillsboro; Ken A. Root, Portland, both of Oreg.

[73] Assignee: Intel Corporation, Santa Clara, Calif.

[21] Appl. No.: 848,501

[22] Filed: May 8, 1997

Related U.S. Application Data

[63] Continuation of Ser. No. 297,693, Aug. 26, 1994, abandoned.

[51] Int. Cl.$^6$ .............................. B06F 17/30; G06F 12/00
[52] U.S. Cl. ........................... 707/206; 707/205; 707/200
[58] Field of Search ................................ 395/620, 621, 395/616, 601, 493; 365/185.33, 185.11; 707/206, 205, 200

[56] References Cited

U.S. PATENT DOCUMENTS

| | | | |
|---|---|---|---|
| 4,279,024 | 7/1981 | Schrenk | 365/185.22 |
| 4,456,971 | 6/1984 | Fukuda et al. | 395/500 |
| 4,511,964 | 4/1985 | Georg et al. | 395/412 |

(List continued on next page.)

FOREIGN PATENT DOCUMENTS

| | | |
|---|---|---|
| 2088442 | 1/1993 | Canada . |
| 175458A2 | 3/1986 | European Pat. Off. . |
| 392895A2 | 10/1990 | European Pat. Off. . |
| 58-215794 | 12/1983 | Japan . |
| 58-215795 | 12/1983 | Japan . |
| 62-283496 | 12/1987 | Japan . |
| 63-183700 | 7/1988 | Japan . |
| 59-162695 | 9/1994 | Japan . |
| 2251323 | 9/1991 | United Kingdom . |
| 2251324 | 11/1991 | United Kingdom . |

OTHER PUBLICATIONS

Michael Bloom, "A Memory to Remember," *ESD: The Electronic System Design Magazine*, vol. 19, No. 10, Oct. 1989, pp. 38–42.

Jonathan Matzkin, "Tiny, Powerful Poquet PC Tips the Scales at 1 lb.," *PC Magazine*, vol. 8, No. 19, Nov. 14, 1989, pp. 33–35, p. 35 missing.

Alfred Rosenblatt, "Make Room for Pocket Computers," *Electronics*, vol. 62, No. 11, Nov. 1989, pp. 93–96.

Ron Wilson, "1–Mbit Flash Memories Seek Their Role in System Design," *Computer Design*, vol. 28, No. 5, Mar. 1, 1989, pp. 30–31.

Bernard C. Cole, "Seeq Pushes Flash Memory to 1 Megabit," *Electronics*, vol. 62, No. 3, Mar. 1989, p. 85.

Carl Olsen Day, "Letters From the Road: Around the World with a Laptop," *PC Computing*, vol. 2, No. 7, Jul. 1989, pp. 108–122.

Micheal C. Markowitz, "Nonvolatile Memories," *EDN*, vol. 34, No. 18, Sep. 1, 1989, pp. 94–100, 102–104.

Daly et al., "Lightweight Laptops Make Hefty Boasts," *Computerworld*, Sep. 18, 1989, p.1

French Patent Office Preliminary Search Report, dated Oct. 19, 1995, for French counterpart Patent Application No. 91–16233.

(List continued on next page.)

*Primary Examiner*—Thomas L. Black
*Assistant Examiner*—Greta L. Robinson
*Attorney, Agent, or Firm*—Blakely, Sokoloff, Taylor & Zafman

[57] ABSTRACT

A system and method for deleting entries of a file system directory located on write-once or erase-slowly media utilizes a technique to collapse linked lists of nodes containing file system information to remove nodes of files that have been deleted or replaced. By collapsing the linked lists, access time to the file system does not increase by eliminating the need of traversing long lists of deleted or replaced nodes.

7 Claims, 7 Drawing Sheets

U.S. PATENT DOCUMENTS

| | | | |
|---|---|---|---|
| 4,642,759 | 2/1987 | Foster | 395/500 |
| 4,644,494 | 2/1987 | Muller | 395/479 |
| 4,718,041 | 1/1988 | Baglee et al. | 365/185.22 |
| 4,755,939 | 7/1988 | Watson | 395/622 |
| 4,757,533 | 7/1988 | Allen et al. | 380/25 |
| 4,775,932 | 10/1988 | Oxley et al. | 365/622 |
| 4,797,810 | 1/1989 | McEntee | 395/622 |
| 4,800,520 | 1/1989 | Iijima | 395/622 |
| 4,802,117 | 1/1989 | Chrosny | 395/182.03 |
| 4,896,262 | 1/1990 | Wayama et al. | 395/500 |
| 4,907,151 | 3/1990 | Bartlett | 395/493 |
| 4,921,629 | 5/1990 | Shuler, Jr. | 510/365 |
| 4,958,315 | 9/1990 | Balch | 395/500 |
| 4,984,149 | 1/1991 | Iwashita et al. | 395/404 |
| 5,012,425 | 4/1991 | Brown | 364/464.15 |
| 5,047,989 | 9/1991 | Canepa et al. | 365/238.5 |
| 5,053,990 | 10/1991 | Kreifels et al. | 395/430 |
| 5,070,474 | 12/1991 | Tuma et al. | 395/500 |
| 5,077,737 | 12/1991 | Leger et al. | 395/182.04 |
| 5,083,299 | 1/1992 | Schwanke et al. | 368/113 |
| 5,101,490 | 3/1992 | Getson, Jr. et al. | 395/835 |
| 5,111,385 | 5/1992 | Hattori | 395/484 |
| 5,126,808 | 6/1992 | Montalvo et al. | 365/185.09 |
| 5,131,089 | 7/1992 | Cole | 395/500 |
| 5,163,021 | 11/1992 | Mehrotra et al. | 365/185.03 |
| 5,193,184 | 3/1993 | Belsen et al. | 395/404 |
| 5,200,959 | 4/1993 | Gross et al. | 371/21.6 |
| 5,210,837 | 5/1993 | Wiecek | 395/375 |
| 5,210,866 | 5/1993 | Milligan et al. | 395/182.04 |
| 5,226,168 | 7/1993 | Kobayashi et al. | 395/300 |
| 5,230,048 | 7/1993 | Moy | 395/600 |
| 5,247,658 | 9/1993 | Barrett et al. | 395/601 |
| 5,261,088 | 11/1993 | Baird et al. | 395/600 |
| 5,268,870 | 12/1993 | Harari | 365/185.09 |
| 5,270,979 | 12/1993 | Harari et al. | 365/185.09 |
| 5,297,029 | 3/1994 | Nakai et al. | 365/238.5 |
| 5,297,148 | 3/1994 | Harari et al. | 371/10.2 |
| 5,301,288 | 4/1994 | Newman et al. | 395/412 |
| 5,307,486 | 4/1994 | Nakamigawa | 395/600 |
| 5,321,834 | 6/1994 | Weiser et al. | 395/622 |
| 5,337,275 | 8/1994 | Garner | 365/189.01 |
| 5,341,330 | 8/1994 | Wells et al. | 365/185.33 |
| 5,341,339 | 8/1994 | Wells | 365/185.11 |
| 5,392,427 | 2/1995 | Barrett et al. | 395/621 |
| 5,398,142 | 3/1995 | Davy | 360/48 |
| 5,404,485 | 4/1995 | Ban | 395/412 |
| 5,488,717 | 1/1996 | Gibson et al. | 395/600 |
| 5,491,810 | 2/1996 | Allen | 395/444 |
| 5,634,050 | 5/1997 | Krueger et al. | 707/200 |

OTHER PUBLICATIONS

K. Robinson, "Trends in Flash Memory System Design," Wescon Conference, Record 34, Nov. 1990, pp. 468–472.

R.D. Pashley and S.K. Lai, *Flash Memories: The Best of Two Worlds*, IEEE Spectrum, pp. 30–33 (Dec. 1989).

M.A. Levy and D. Elbert, *Solutions for High Density Applications Using Intel Falsh Memory* (Oct. 1990), *1991 Memory Products Handbook*, Intel Corp., pp. 6–297 through 6–344 (1990).

S. Zales, *Flash Memory Outshines ROM and EPROM*, EETimes (May 1990), 1991 Memory Products Handbook, Intel Corp., pp. 6–411 through 6–416 (1990).

Data Sheets for the iMC001 FLKA and the iMC004FLKA, *1991 Memory Products Handbook*, Intel Corp., pp. 6–143 through 6–202 (Oct. 1990).

D.A. Patterson, J.L. Hennessy, and D. Goldberg, *Computer Architecture a Quantitive Approach*, Morgan Kaufmann Publishers, Inc., p. 519 (1990).

R. Pashley, *Nonvolatility: Semiconductor vs. Magnetic*, IEEE, International Solid–State Circuits Conference (Feb. 17, 1988), 1991 Memory Products Handbook, Intel Corp., pp. 6–393 and 6–394 (1990).

D. Lammers, *PC Standard in the Cards*, EETimes (May 1990), 1991 Memory Products Handbook, Intel Corp., pp. 6–407 through 6–410 (1990).

*Memory Breakthrough Drives Miniaturization*, Portable Computing (Oct. 1990), 1991 Memory Products Handbook, Intel Corp., pp. 6–419 and 6–420 (1990).

S. Baker, *Silicon Bits, The Memory Driver*, 1991 Memory Products Handbook, Intel Corp., p. 6–399 (1990).

D. Verner, *Designing an Updatable BIOS Using Flash Memeory*, 1991 Memory Handbook, Intel Corp., pp. 6–248 through 6–296 (Oct. 1990).

Bernard C. Cole, "How the U.S. is Leading the Way in Strategic Nonvolatile Technology," *Electronics*, vol. 62, No. 3, Mar. 1989, pp. 80–83.

C. Townsend, *Advanced MS–DOS Techniques for Programmers*, pp. 1–63 (Howard W. Sams & Company 1989).

he present invention relates to a file storage system on a write-once or erase-slowly media.

SYSTEM AND METHOD FOR REMOVING DELETED ENTRIES IN FILE SYSTEMS BASED ON WRITE-ONCE OR ERASE-SLOWLY MEDIA

This is a continuation of application Ser. No. 08/297,693, filed Aug. 26, 1994, now abandoned.

BACKGROUND OF THE INVENTION

1. Field of the Invention

The present invention relates to a file storage system on a write-once or erase-slowly media.

2. Art Background

In computer systems, memory devices have become large enough to support the storage of data in file systems. Each file system includes at least one directory which identifies a file stored and a pointer to the location of the file in memory. Each file in a directory is represented as a node in a linked list. Each node includes such information as the file name and the location in memory of the file. In addition, each node will include a pointer to the next node. To provide a means for deleting nodes when the corresponding file is to be deleted, the node may contain a replacement pointer or a delete flag. The replacement pointer points to a node that replaces the node to be deleted and the delete flag, when set, identifies that the file corresponding to the node has been deleted.

An exemplary node is represented in FIG. 1. A node 100 includes a field called "next node" 110 which points to the next node in the linked list, replacement node 120 which includes a pointer to a node which replaces node 100, the delete flag 130, which when set identifies that the node 100 has been deleted, and file name and other information 140 relevant to the particular file for identification of the file.

FIG. 2 is illustrative of a linked list which includes deleted and replaced nodes. A node can be deleted in one of two ways. It can be marked deleted by setting the delete flag in the node or it can be marked as replaced by setting the replacement pointer to the node replacing it. These two methods of deletion correspond respectively to the file system operations of deleting a file and renaming a file. An illustrative linked list is shown in FIG. 2. Node 210 points to node 215. The replacement pointer field in node 215 includes a pointer to node 220, such that node 220 replaces node 215. However, node 220 also includes a pointer in the replacement pointer field which points to node 225. Therefore node 225 replaces node 220. Node 225 is marked "deleted" and the next node pointer of node 225 points to node 230. Node 230 and node 235 are also both marked "deleted". The pointer to the next node in node 235 points to node 240. The nodes deleted or replaced in this manner are never removed from the linked list due to the medium on which the information is written. Therefore, each time the list is accessed, the system must traverse all nodes even though only nodes 210 and 240 are active.

When the information is written in write-once or erase-slowly media, it is impossible or impractical to physically erase nodes from the medium in order to perform a deletion or replacement. Therefore, file system performance degrades dramatically because long lists of deleted and replaced nodes remain as a side-effect of deleting, recreating and renaming files. The present invention allows deleted nodes and replaced nodes to be removed from a linked list, eliminating the performance degradation associated with continued file system use.

SUMMARY OF THE INVENTION

A method and system of collapsing linked lists of file system directories is provided. When the linked list of deleted and replaced nodes become sufficiently long, a node immediately prior to the first node of the linked list of deleted and replaced nodes is replaced with a duplicate node, the pointer of which points to the node immediately after the end of the list of deleted and replaced nodes. Alternately, the process of nesting the collapsing of lists can be performed by replacing a node in the list in order to remove a portion of a list of nodes.

BRIEF DESCRIPTION OF THE DRAWINGS

The objects, features and advantages of the present invention will be apparent from the following detailed description in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1:
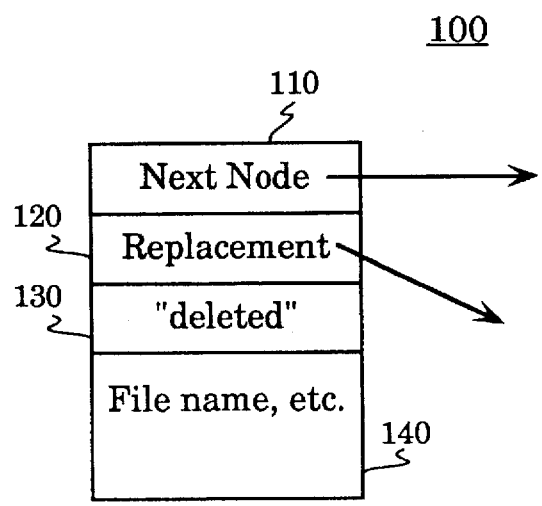
FIG. 1 is a prior art figure of a node used in a file system directory.
Figure 2:
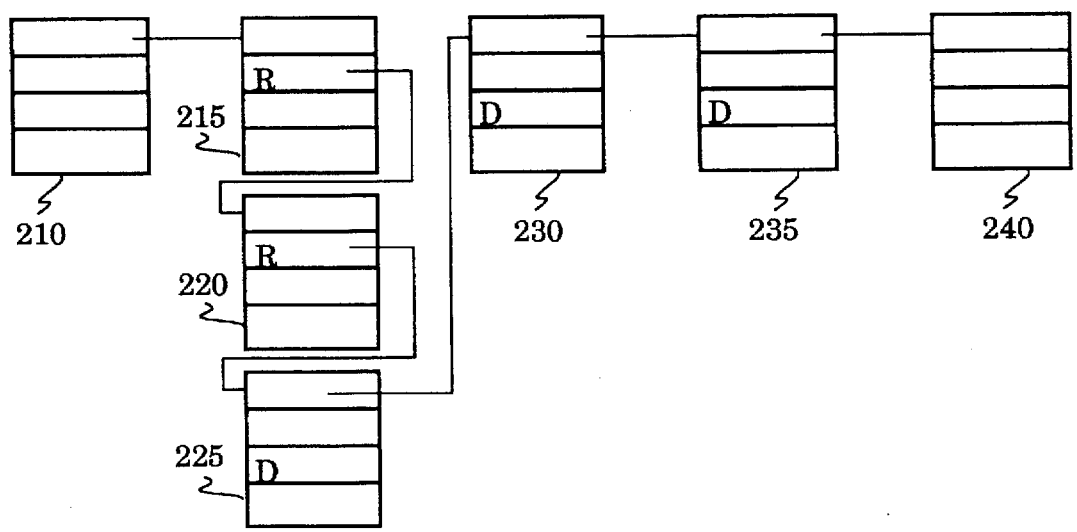
FIG. 2 is a prior art example of a directory linked-list, including deleted and the replaced nodes.
Figure 3:
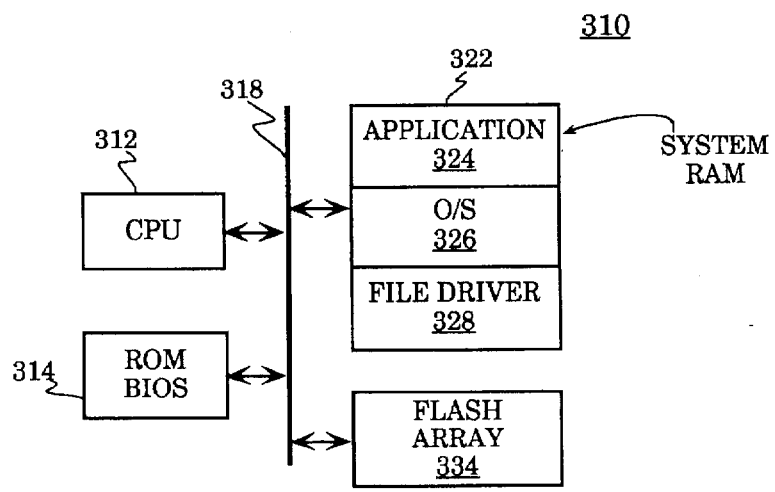
FIG. 3 is a system diagram which employs the file system and method of the present invention.

FIG. 3 is a block diagram illustration of one exemplary system which employs the system and method of the present invention. It is readily apparent to one skilled in the art that the present invention is not limited to such a system and that other systems, which include a processor and memory, may be structured in accordance with the teachings of the present invention to provide the structure and method for removing deleted or replaced entries of a directory linked list in a write-once or erase-slowly media.

Referring to FIG. 3, the system includes the processor or CPU 312, which is coupled to a bus 318 to which memory such as system RAM 322 and erase-slowly media flash array 334 are coupled. System RAM 322 includes code representative of applications 324, operating system 326, and in the present illustration, file driver 328 which controls flash array 334 and the file system contained in the flash array 334. Flash array 334 and system RAM 322 are coupled to the bus 318 for communication. Also included in the present illustration is a ROM BIOS 314 which includes code to boot up the system.

The file system is stored in the flash memory array 334 and, in the present example, is controlled by file driver 328. Alternately, the file system can be controlled by a controller located on the flash device 334 or by the CPU 312. The file system includes a plurality of files which are identified and located through a directory. The directory includes a linked list of nodes, each node identifying a file location in the memory. The node includes a plurality of parameters such as a next pointer, a replace pointer, a delete flag and file identification information. The next pointer provides a pointer to the next node in the linked list. The replacement pointer, when set to a value, points to a node which replaces the current node. Therefore, when traversing the linked list to locate a file, the information contained in the current node, including the next pointer and the file identification information, is ignored and instead the node the replacement pointer points to is examined. The delete flag is a flag which identifies that the file identified by the current node is deleted. The identification information includes information such as the file name and the location of the corresponding file.

As flash media takes a significant amount of time to erase, the replacement pointer and the delete flag are used to "replace" and "delete" file entries in the file system without actually performing actual replacement and deletion operations. However, as the amount of usage of the file system increases, the number of deleted or replaced nodes increases and the latency incurred by having to traverse the linked list, including the deleted or replaced nodes, increases. To overcome this drawback and reduce the build-up of long list of deleted or replaced file entries, a system and method for removing these entries is described.

Figure 4:
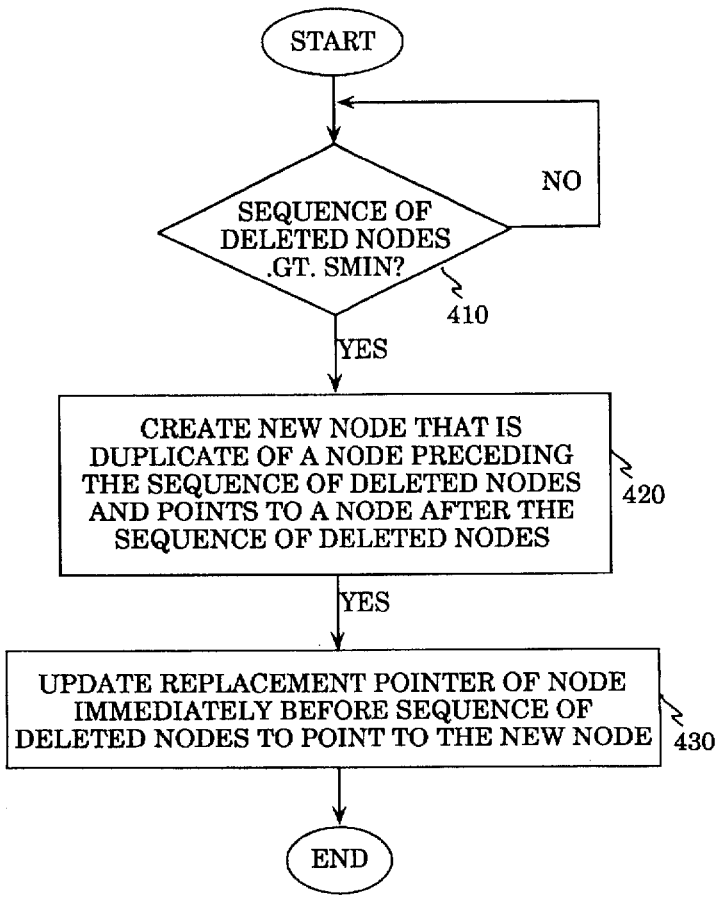
FIG. 4 is a flow diagram illustrating one process for improving performance of file systems on write-once or erase-slowly media.

The process for removing sequences of deleted/replaced entries is generally described with reference to FIG. 4. At step 410, it is determined whether a sequence of deleted/replaced nodes should be removed. In the present illustration, the removal process is triggered by the existence of a sequence of a predetermined number of nodes which is identified to be sufficiently long for removal. Alternately, the removal process may be triggered by a time parameter wherein the process is performed after a predetermined amount of time has elapsed or a check of the number of deleted/replaced nodes is determined after a predetermined amount of time has elapsed. Other triggers, such as a trigger based upon the number of accesses to the memory, can also be used.

Referring again to FIG. 4, once it is determined to proceed with the removal process, a new node is created containing a duplicate of the file information of a node immediately preceding in the linked list the first node of the sequence of deleted and replaced nodes. The created node differs from the node immediately preceding the sequence of deleted and replaced nodes in that the next node pointer of the created node is set to point to the first node after the sequence of deleted and replaced nodes, thus removing the sequence of deleted and replaced nodes from the linked list. At step 430, the replacement pointer of the immediately preceding node is set to point to the created node thereby completing the reorganization of the linked list.

The number of replaced or deleted nodes that is considered to be sufficiently long, SMIN, to collapse and remove from the list is determined according to the maximum length of time that is acceptable for accessing a file in the file system. More particularly, the length of the sequence is preferably determined by examining the maximum amount of acceptable time for a system to traverse a list, which includes deleted and replaced nodes, in order to read a node and access the file identified by the node. The sequence length should not be too short such that replacements are performed too frequently and the buildup of replaced nodes is rapid. Furthermore, the sequence length should not be too long, such that system performance is erratic, fluctuating between extremely long access times (due to the amount of time expended traversing the linked list having long sequences of delete and replaced nodes) and short access time (once sequences of deleted and replaced nodes have been removed from the linked list). Preferably the SMIN value is determined empirically in view of the system and software applications executed by the system. However, SMIN can be estimated by considering a number of factors, including the projected file system size, the number of expected delete and replace operations that will take place during the life of the file system, the amount of time required to read a node and the amount of time to access a file.

Figure 5A:
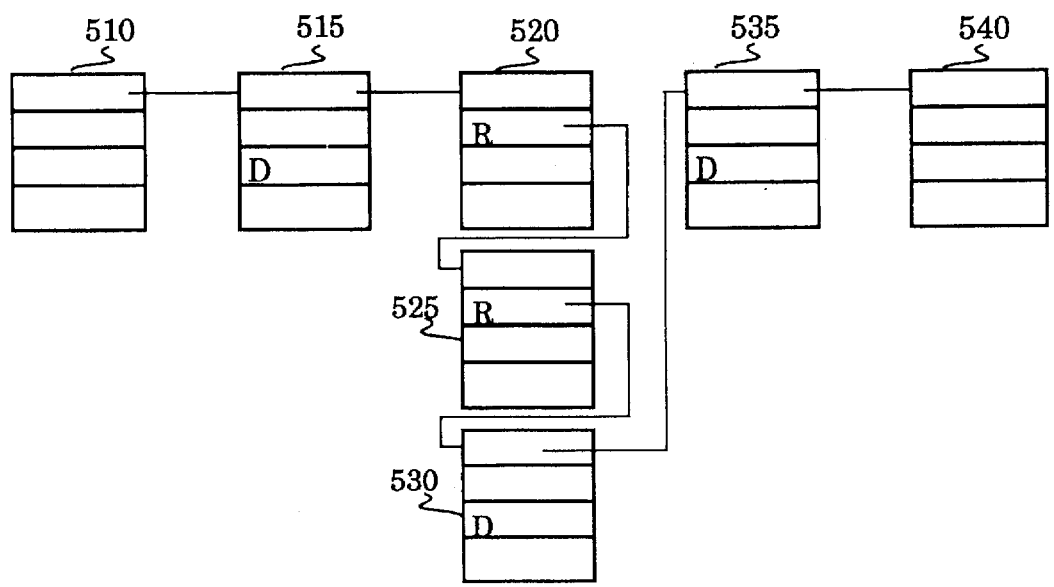
FIG. 5a and FIG. 5b are diagrams which illustrate the removal of replaced or deleted nodes of a linked list in a directory of a file system located on write-once or erase-slowly media.
Figure 5B:
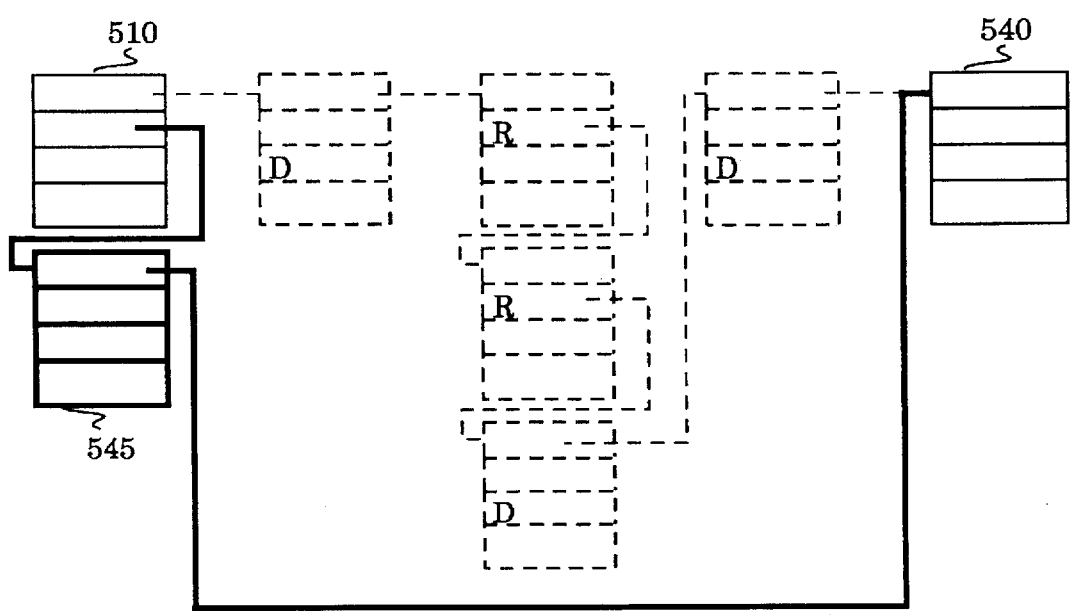

The process is illustrated by way of example in FIGS. 5a and 5b. FIG. 5a shows a sequence of nodes of a directory of a file system in which there is a series of deleted nodes 515, 520, 525, 530, 535. The result of applying the process described, as shown in FIG. 5b, is the addition of a new node 545 which contains the same file identification as node 510 and a next pointer which points to node 540. Furthermore, the replacement pointer of node 510 is set to point to node 545. Thus, when an operation is to be performed with respect to the file system, the time required to access the directory, and therefore the files, is minimized as the system simply traverses nodes 510, 545 and 540 as opposed to nodes 510, 515, 525, 530, 535 and 540.

Figure 6:
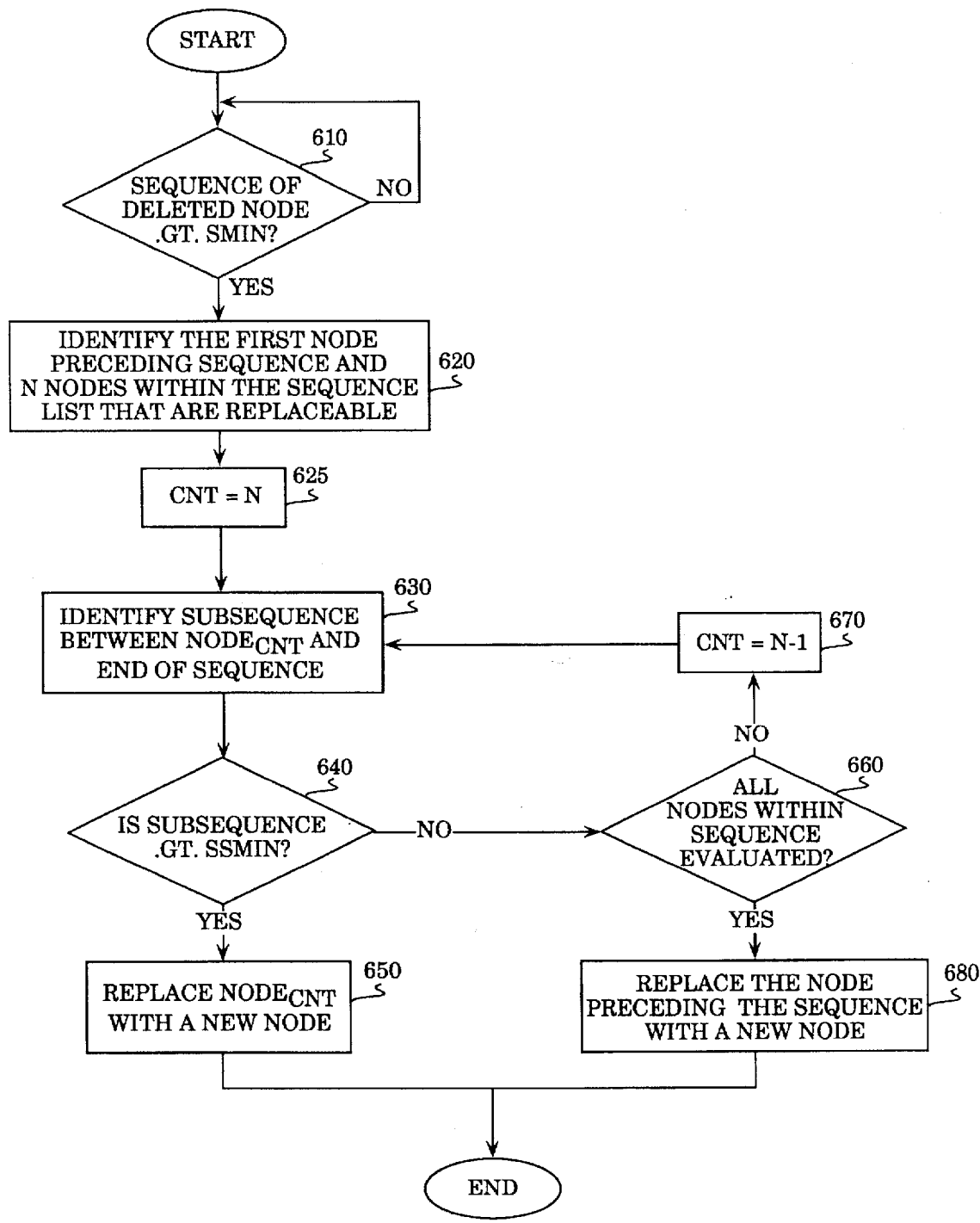
FIG. 6 is a flow diagram illustrating an alternate embodiment of the removal of nodes of a linked list directory of a file system.

FIG. 6 illustrates an alternate embodiment of the present invention. In order to enhance the effectiveness of the removal process, the removal of sequences of deleted and replaced nodes are nested to slow down the occurrence of the number of replaced nodes at the beginning of the linked list. The following example uses a time elapsed trigger for performing the removal process; however, this process can also use other triggers as noted above. Referring to FIG. 6, at step 610, after a predetermined amount of time has elapsed, the linked list is checked to determine sequences of replaced/deleted that are sufficiently long to be replaced. The first replaceable node immediately preceding the sequence and the first predetermined number "n" of replaceable nodes (i.e., deleted nodes in which the replacement pointer has not been set) within the sequence are identified, step 620. It is apparent that if the sequence does not contain "n" replaceable nodes, a number of replaceable nodes less than "n" is identified. If the sequence does not contain any replaceable nodes, then the process defaults to the first embodiment described above in which the node immediately preceding the sequence of deleted/replaced nodes is replaced to remove the sequence.

The process continues by examining the identified replaceable nodes to determine the node to be replaced. In the present illustration, the variable "cnt" is used to identify the node of the set of replaceable nodes. Cnt is initialized to identify the last replaceable node of the set of nodes and is decremented as each node prior to the last node is examined. However, it is readily apparent to one skilled in the art that other mechanisms for identifying the nodes may be used.

At step 630 the sub-sequence to be examined is determined based upon the node identified by the "cnt" variable. More particularly at steps 640, 650, the node identified by the current cnt value node$_{cnt}$, is replaced with a new node if the sub-sequence of nodes between the node$_{cnt}$ and the last node of the sequence of deleted/replaced nodes is greater than a minimum number identified herein as the sub-sequence minimum (SSMIN). Preferably the SSMIN value is equal to SMIN, although it is readily apparent that other values can be used in accordance with the performance desired. At step 650, if the length of the sub-sequence is greater than or equal to SSMIN, the node, node$_{cnt}$, is replaced. If the length of the sub-sequence is less than SSMIN, the next sub-sequence between the next node and the end of the sequence of deleted/replaced nodes is checked to determine if the length of the sub-sequence is greater than or equal to SSMIN by executing process steps 660, 670, 630 and 640. This process continues for the set of n replaceable nodes. If none of the sub-sequences meet the SSMIN criteria, the process defaults to the first replaceable node immediately preceding the sequence of deleted/replaced nodes is utilized, step 680. This method of a nested collapsing of a linked list directory prolongs the occurrence of nonreplaceable deleted nodes that occur near the head of the list and extends the life of the directory listing in write once or erase slowly media.

Figure 7A:
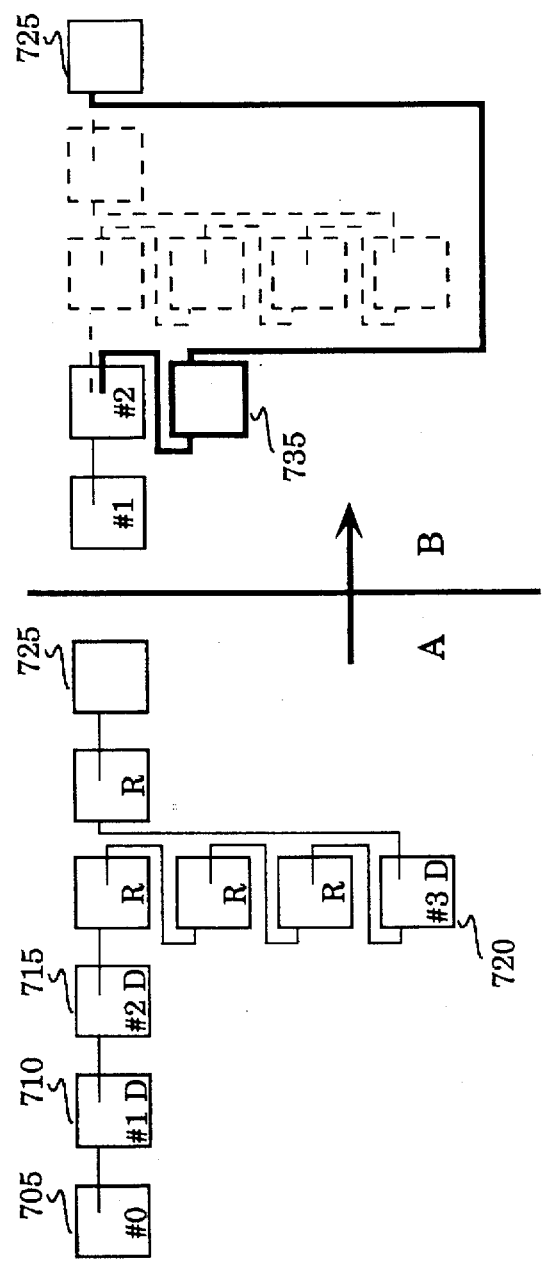
FIG. 7a illustrates an example of the removal of deleted or replaced nodes on write-once or erase-slowly media for a sequence of three replaceable nodes.
Figure 7B:
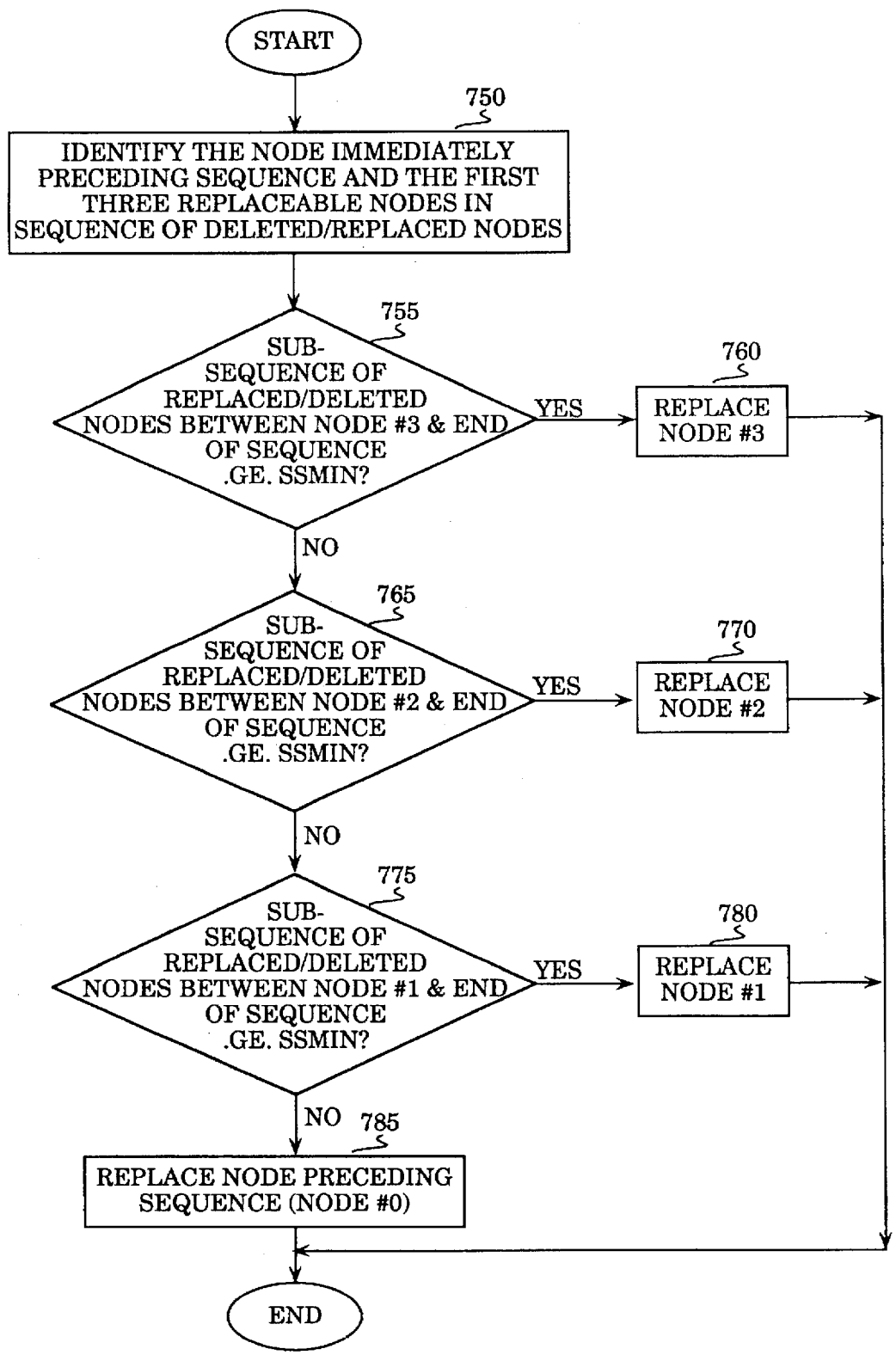
FIG. 7b is a corresponding flowchart for the process of removal of deleted or replaced nodes.

FIG. 7a and FIG. 7b illustrate an example of this alternate embodiment. Referring to FIG. 7b, n is set to 3 and, at step 750, the first three replaceable nodes in the sequence are identified. As shown in FIG. 7a, the first three nodes are node 1 710, node 2 715 and node 3 720. The replaceable node 705 immediately prior to the sequence is identified as node 0. A check is then performed, step 755, to compare the sub-sequence of replaced/deleted nodes between node 720 and the end of the sequence to determine if the number of nodes are greater than the SSMIN. If the answer is yes, at step 760, node 3 is replaced with a node that points to the first node 725 subsequent to the sequence of deleted/replaced nodes. If the number of nodes in the sub-sequence is not greater than SSMIN, at step 765, a check is then performed to compare the subsequence between node 2 and the end of the sequence of deleted/replaced nodes. If this tests true, then at step 770, node 2 is replaced. If the sub-sequence is less than SSMIN, the subsequence defined by node 1 is then examined, steps 775, and node 1 is replaced, step 780, if the subsequence is greater than or equal to SSMIN. If the sub-sequence defined by node 1 is less than SSMIN, the node preceding the sequence of deleted/replaced nodes, in the present illustration, node 705, is replaced.

In the example shown in FIG. 7a, the subsequence of nodes between nodes 3 and the end of the sequence is not sufficiently long. However, the subsequence delineated by node 2 is sufficiently long and node 2 is replaced with new node 735 which points to node 725. This refinement allows nodes that were replaced by collapsing a list, to themselves be replaced at a later time, changing a linear degradation of performance into a log degradation. The choice of the number of nodes to select among and the definition of SSMIN can be adjusted for any given implementation such that file system performance does not noticeably degrade over the life of the file system.

Figure 8:
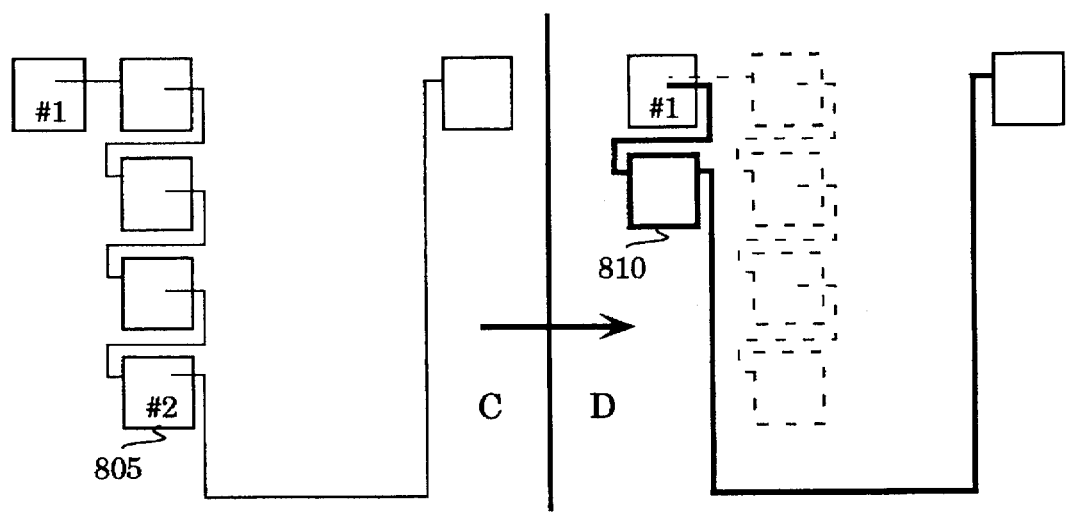
FIG. 8 illustrates an alternate example of removal of deleted or replaced nodes on write-once or erase-slowly in accordance with the teachings of the present invention.

FIG. 8 is an illustration of a series of nodes that have been collapsed many times. In this example, node 2 805, itself a replacement node, is replaced by the addition of node 810 to further collapse the list.

The invention has been described in conjunction with a preferred embodiment. It is evident that numerous alternatives, modifications, variations and uses will be apparent to those skilled in the art in light of the foregoing description.

What is claimed is:

1. In a computer system comprising a processor and write once or erase slowly memory, said memory storing a file system including a file system directory in the structure of a linked list of nodes, each node identifying a corresponding file in the file system, each node comprising file identification information, a next pointer field which contains a pointer to a next node in the linked list, a replacement pointer field, which when set to contain a replacement pointer, points to a replacement node which replaces the node, and a delete flag field, which indicates whether the node has been deleted, a method for removing deleted and replaced nodes from the linked list directory, comprising the steps of:

(a) determining in the linked list a sequence of nodes that contain either a replacement pointer in the replacement pointer field to indicate that the corresponding file is replaced or a delete flag set to indicate that the corresponding file is deleted;

(b) if the number of nodes in the sequence is greater than a first threshold, creating a new node that contains file identification information of a node which immediately precedes the sequence, the next pointer field of the new node containing a pointer to a next node after the sequence of nodes; and (c) modifying the replacement pointer field of the node which immediately precedes the sequence to point to the new node;

wherein the number of nodes in the linked list is decreased.

2. The method as set forth in claim 1, wherein the step of determining is performed when a predetermined amount of time elapses.

3. The method as set forth in claim 1, wherein the step of determining is performed after each replace and delete operation.

4. In a computer system comprising a processor and write once or erase slowly memory, said memory storing a file system including a file system directory in the structure of a linked list of nodes, each node identifying a corresponding file in the file system, each node comprising file identification information, a next pointer field which contains a pointer to a next node in the linked list, a replacement pointer field, which when set to contain a replacement pointer, points to a replacement node which replaces the node, and a delete flag field, which indicates whether the node has been deleted, a method for removing deleted and replaced nodes from the linked list directory, comprising the steps of:

(a) determining in the linked list a sequence of nodes that contain either a replacement pointer in the replacement pointer field to indicate that the corresponding file is replaced or a delete flag set to indicate that the corresponding file is deleted;

(b) identifying a set of "n" of replaceable nodes in the sequence;

(c) identifying a sub-sequence of the sequence of deleted and replaced nodes to be the nodes between a current node of the set of n replaceable nodes and the end of the sequence;

(d) if the number of nodes in the sub-sequence is greater than a first threshold, (1) creating a new node that contains file identification information of the current node, the next pointer field of the new node containing a pointer to a next node after the sequence of nodes, and (2) modifying the next pointer of the current node to point to the new node;

(e) performing steps (c) and (d) for each node of the set of nodes until a new node is created;

(f) if a new node is not created, creating a new node that contains file identification information of a node which immediately precedes the sequence, the next pointer field of the new node containing a pointer to a next node after the sequence of nodes, and modifying the replacement pointer field of the node which immediately precedes the sequence to point to the new node;

wherein the number of nodes in the linked list is decreased.

5. A computer system comprising:

a processor;

write once or erase slowly memory coupled to the processor;

a file system comprising files stored in the memory;

a file system directory contained within the file system, the file system directory comprising a structure of a linked list of nodes, each node identifying a corresponding file in the file system, each node comprising file identification information, a next pointer field which contains a pointer to a next node in the linked list, a replacement pointer field, which when set to contain a replacement pointer, points to a replacement node which replaces the node, and a delete flag field, which indicates whether the node has been deleted;

a memory controller coupled to control the memory, said controller; determining in the linked list a sequence of nodes that contain either a replacement pointer in the replacement pointer field to indicate that the corresponding file is replaced or a delete flag set to indicate that the corresponding file is deleted; if the number of nodes in the sequence is greater than a first threshold, said controller creating a new node that contains file identification information of a node which immediately precedes the sequence, the next pointer field of the new node containing a pointer to a next node after the sequence of nodes, and modifying the replacement pointer field of the node which immediately precedes the sequence to point to the new node;

wherein the number of nodes in the linked list is decreased.

6. The system as set forth in claim 5, said controller prior to creating a new node that contains file identification information of a node which immediately precedes the sequence, examining replaceable nodes within the sequence of replaced and deleted nodes to determine if the number of nodes between a replaceable node and the end of the sequence is greater than a second threshold such that if the number of nodes is greater than a second threshold, said controller creating a new node that contains file identification information of the replaceable node, the next pointer field of the new node containing a pointer to a next node after the sequence of nodes, and modifying the replacement pointer field of the replaceable node which immediately precedes the sequence to point to the new node.

7. A computer system comprising:

a processor;

write once or erase slowly memory coupled to the processor;

a file system comprising files stored in the memory;

a file system directory contained within the file system, the file system directory comprising a structure of a linked list of nodes, each node identifying a corresponding file in the file system, each node comprising file identification information, a next pointer field which contains a pointer to a next node in the linked list, a replacement pointer field, which when set to contain a replacement pointer, points to a replacement node which replaces the node, and a delete flag field, which indicates whether the node has been deleted;

means for determining in the linked list a sequence of nodes that contain either a replacement pointer in the replacement pointer field to indicate that the corresponding file is replaced or a delete flag set to indicate that the corresponding file is deleted; and if the number of nodes in the sequence is greater than a first threshold, means for creating a new node that contains file identification information of a node which immediately precedes the sequence, the next pointer field of the new node containing a pointer to a next node after the sequence of nodes, and modifying the replacement pointer field of the node which immediately precedes the sequence to point to the new node;

wherein the number of nodes in the linked list is decreased.

\* \* \* \* \*